United States Patent Office 3,509,112
Patented Apr. 28, 1970

3,509,112
POLYMERIC ADDUCTS OF MONOEPISULFIDES AND PRIMARY AMINES
Grant McLay Cameron, Tonawanda, N.Y., assignor to Ciba Limited, Basel, Switzerland, a company of Switzerland
No Drawing. Filed Apr. 18, 1966, Ser. No. 543,088
Claims priority, application Great Britain, May 13, 1965, 20,319/65
Int. Cl. C08g 23/00
U.S. Cl. 260—79                            11 Claims

ABSTRACT OF THE DISCLOSURE

Curable compositions comprising (1) a compound containing mercaptan groups, and (2) an oxidative curing agent, component (1) being an adduct of a monoepisulphide and a compound containing at least two active hydrogen atoms, such as a primary amine or a polythiol and component (2) being a compound such as lead dioxide or tellurium dioxide.

---

This invention relates to curable compositions, which can be cured to form elastomeric products.

It is known to produce polymeric substances in which each molecule of polymer contains a plurality of mercaptan (—SH) groups and which may be cured by the use of so-called oxidative curing agents to products in which the polymer molecules are linked by disulphide groups (—S—S—). These products may be used, for example, as sealants and caulking agents (see, e.g., High Polymers, vol. 10, Part III, Polyethylene sulphides and other polythioethers, ed. Gaylord, Interscience, 1962). The curing may be made more rapid by the use of substances, e.g. tertiary amines, known as accelerators, and may also, if desired, be slowed down (e.g. to give materials of longer pot-life) by the use of inhibitors or retardants. Known polymers containing mercaptan groups which may be cured in this manner suffer from the disadvantage that they are relatively expensive, and that, unless prepared as dispersions or latices, they are liable to contain included starting materials which are difficult to remove.

This invention provides new curable compositions which comprise a compound containing mercaptan groups and an oxidative curing agent, in which the aforesaid disadvantages are avoided or mitigated.

The new compositions comprise one or more adducts, containing on average more than two mercaptan groups per molecule, made from one or more monoepisulphides and one or more compounds containing on average more than two hydrogen atoms directly attached to sulphur or to nitrogen per molecule, and one or more oxidative curing agents for the said adduct or adducts. The invention includes within its scope the process for curing the aforesaid compositions, especially under neutral or basic pH conditions, and with or without the application of heat, and the cured elastomeric products obtained thereby.

Monoepisulphides, i.e. compounds containing the thiuran group

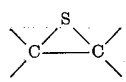

which may be used in making the aforesaid adducts, include, for example, propylene sulphide (2-methylthiuran), ethylene sulphide, isobutylene sulphide, dodecylene sulphide, cyclohexene sulphide, allyl 2,3-epithiopropyl ether, and styrene sulphide. Particularly suitable monoepisulphides are those consisting solely of hydrogen, sulphur, from 2 to 10 carbon atoms, and optionally, one ether oxygen atom. Preferably, an alkylene episulphide containing from 2 to 5 carbon atoms, especially propylene sulphide, is used. It is of course, possible to make the adducts from mixtures of monoepisulphides.

The compounds, containing per molecule more than two hydrogen atoms directly attached to sulphur, which are used to form the adduct with the monoepisulphide are preferably those having three or more mercaptan groups per molecule, such as 2,4,6-tris(2-mercaptoethyl)-1,3,5-trioxan, trithiocyanuric acid (2,4,6-trimercapto-1,3,5-triazine), esters of mercaptoalcohols with tri- or higher carboxylic acids, and esters of trihydric or higher alcohols with mercaptocarboxylic acids, e.g. a polypropylene triol tris(thioglycollate). The compounds, containing per molecule more than two hydrogen atoms directly attached to nitrogen, which are used to form the adduct with the monoepisulphide are preferably those having in the molecule either at least two primary amino groups or at least one primary amino group and at least one secondary amino group. There may thus be used diprimary amines such as ethylenediamine, diethylenetriamine, p-phenylenediamine, bis(4-aminophenyl)methane, bis(4-aminocyclohexyl)methane, bis(4-aminophenyl) ketone, bis(4-aminophenyl) ether and bis(4-aminophenyl) sulphone and primary-secondary amines, such as N-ethylethylenediamine, N-methyl-p-phenylenediamine, and N-methylpropane-1,3-diamine. It is particularly preferred to employ an aliphatic or cycloaliphatic polyamine having not more than 20 carbon atoms and containing at least two primary amino groups.

The adducts used in the new composition are, in general, known compounds, and may be prepared in conventional manner, e.g. by reaction between the monoepisulphide and the compound containing active hydrogen in the presence of an acidic catalyst, such as boron trifluoride diethyl etherate, or a basic catalyst, such as sodium ethoxide, potassium hydroxide, or N-benzyldimethylamine. If the active-hydrogen-containing compound is an amine, addition of a catalyst is usually unnecessary.

The oxidative curing agent used in the compositions of the invention is preferably lead dioxide or tellurium dioxide; but zinc oxide, magnesium oxide, manganese dioxide, organic peroxides such as benzoyl peroxide and ethyl methyl ketone peroxide, and organic hydroperoxides, such as cumene hydroperoxide and tertiary butyl hydroperoxide, may also be used, as well as hot-curing agents such as p-benzoquinonedioxime. The curing agents may be used either in solution or dispersed in a plasticiser for the cured composition, such as dibutyl phthalate or a chlorinated polyphenyl.

The new curable compositions preferably also contain an accelerator for the curing reaction. For this purpose may be used, for example, m-dinitrobenzene, sulphur, diphenylguanidine or tetramethylthiuram disulphide. To promote rapid autogenous cure of the composition at room temperature, a tertiary amine, such as triethylenediamine (i.e., 1,4-diazobicyclo[2.2.2]octane, N-benzyldimethylamine, and 2,4,6-tris(dimethylaminomethyl)-phenol, or an alkali-modified clay may be incorporated. By varying the amount of the tertiary amine, compositions may be prepared having a large range of pot-lives. If desired, an inhibitor or retardant, e.g. a long-chain fatty acid (such as stearic acid or oleic acid) or a metal salt thereof (i.e. a soap, such as aluminium distearate, cadmium stearate or aluminium octoate), may be included to prolong the pot-life of the curable composition.

To enhance the adhesive properties of the cured products, it is advantageous to incorporate in the curable compositions a tackifier or adhesion promoter, such as a liquid or solid resole phenolic resin, an epoxy resin, or a polyvinyl acetate.

The compositions may also contain fillers and thixotropic agents such as finely-divided silica (especially that available under the registered trademark "Aerosil" which is a submicroscopic pyrogenic silica made at 1100° C.), carbon black, lithopone, titanium dioxide, barytes, calcium carbonate, calcium silicate, magnesium silicate, aluminium silicate, and finely-divided metals such as aluminium powder.

Such fillers and other solid additives are advantageously incorporated in the compositions by ball-milling.

The compositions of the present invention may be used as sealants, caulking agents, cable-jointing agents, and the like. The used products show a high resistance to aqueous strong non-oxidizing acids. The curable compositions are suitably supplied in the form of two separate formulations, one containing the adduct, and the other the oxidative curing agent. The first formulation may contain fillers, accelerators and other additives which do not react with the adduct, and the second may contain plasticisers and retardants. Immediately prior to use, the two formulations are mixed thoroughly and allowed to cure, with the application of heat if desired or necessary.

The following examples illustrate the invention. Unless otherwise specified, "parts" denotes parts by weight. The lead dioxide paste employed (except where otherwise indicated) was made up of equal parts of the dioxide and di-n-butyl phthalate.

The adducts utilised were prepared as follows.

Polythiol A

Propylene sulphide (74 g., 1 g.-mole) was added to a solution of ethylenediamine (15 g., 0.25 g.-mole) in toluene (50 ml.) heated to 85° C. The mixture was kept at 100° C. to 110° C. for 5 hours, and then heated at 80° C. under 14 mm. pressure to remove volatile materials. There remained 76.5 g. of a clear, colourless liquid of low viscosity having an average molecular weight (as found by acetylation and by titration with iodine) of about 320. Examinations of the infra-red spectrum of the product confirmed that the product still contained some secondary amino groups.

A solution of 16 g. (approx. 0.05 g.-mole) of the intermediate product in dimethylformamide (50 ml.) containing 10 drops of N-benzyl-dimethylamine was treated at 85° C. with a further 74 g. of propylene sulphide. The mixture was heated at 80° C. under 14 mm. pressure to remove volatile materials. There remained a liquid (polythiol A) of medium viscosity, having an average molecular weight of 1800, in a yield of 87.5 g. (i.e. 97% of the theoretical value).

Polythiol B

Trithiocyanuric acid (2.23 g., 0.0125 g.-mole) was dissolved in a solution of potassium hydroxide (2.2 g.) in water (30 ml.), and the mixture was heated to ca. 80° C. in an atmosphere of nitrogen. Propylene sulphide (37 g., 0.5 g.-mole) was added at a rate sufficient to maintain the mixture at this temperature without external application of heat. After the mixture had been cooled, concentrated hydrochloric acid (3.2 ml.) was added to neutralise the alkali, and the organic phase was then extracted with chloroform. On removal of volatile materials from the chloroform extract by heating at 90° C. under 14 mm. pressure, there remained an opaque, fairly viscous liquid containing 0.93 thiol equiv./kg.; this value indicates an average molecular weight of ca. 3200. The yield was 37.1 g. (i.e. 93.6% of the theoretical value).

Polythiol C

Ethylenediamine (3 g., 0.05 g.-mole) was dissolved in dimethylformamide (50 ml.), and the mixture was heated to ca. 80° C. in an atmosphere of nitrogen. Propylene sulphide (185 g., 2.5 g.-mole) was added dropwise at a rate sufficient to maintain the mixture at this temperature without external application of heat. After addition had been completed, the mixture was heated to 130° C. for 15 minutes, and then at 100° C./0.2 mm. to remove volatile materials. There remained 175.6 g. (93.4% of the theoretical value) of a clear, yellow, viscous liquid, containing 0.88 thiol equiv./kg. The infrared spectrum of the material showed no N-H absorption. Since the material is tetrafunctional, the thiol value indicates an average molecular weight of ca. 3,400.

Example I

A mixture was prepared comprising:

| | Parts |
|---|---|
| Polythiol A | 20 |
| Titanium dioxide | 20 |
| "Aerosil" | 0.5 |
| Lead dioxide paste | 5 |
| 2,4,6-tris(dimethylaminomethyl)phenol | 0.3 |

The mixture became tack-free within one hour and cured within 24 hours at room temperature to a strong, elastic rubber which exhibited some plastic flow.

Example II

A mixture was prepared comprising:

| | Parts |
|---|---|
| Polythiol A | 20 |
| Titanium dioxide | 12 |
| "Aerosil" | 0.9 |
| Sulphur | 0.05 |
| Lead dioxide paste | 5.5 |
| 2,4,6-tris(dimethylaminomethyl)phenol | 0.4 |

The mixture cured within 24 hours at room temperature to a fairly elastic rubber having a Shore A hardness of 40 and exhibiting no plastic flow.

Example III

A mixture was prepared comprising:

| | Parts |
|---|---|
| Polythiol B | 15 |
| Lead dioxide paste | 4 |
| Sulphur | 0.05 |
| "Aerosil" | 0.5 |
| 2,4,6-tris(dimethylaminomethyl)phenol | 0.4 |
| Titanium dioxide | 10 |

The mixture cured within 24 hours at room temperature to a tack-free rubber which flowed easily under load, but exhibited good retention properties.

Example IV

A mixture was prepared comprising:

| | Parts |
|---|---|
| Polythiol C | 15 |
| Titanium dioxide | 10 |
| Lead dioxide paste | 4 |
| "Aerosil" | 0.5 |
| Sulphur | 0.05 |
| 2,4,6-tris(dimethylaminomethyl)phenol | 0.4 |

The mixture cured within 24 hours at room temperature to a fairly hard, tack-free rubber which flowed under load and also had good retention properties.

Example V

Mixtures were prepared as follows, the figures denoting parts:

| | A | B |
|---|---|---|
| "Thiokol LP 32" | 50 | |
| Polythiol A | | 50 |
| Titanium dioxide | 7.5 | 7.5 |
| China clay | 42.5 | 42.5 |
| Lead dioxide paste | | 12.5 |
| Lead dioxide paste comprising 50 parts lead dioxide, 45 parts dibutyl phthalate, and 5 parts stearic acid | 7.5 | |

The china clay employed was an alkali-treated china clay available under the designation "Varon A" from Pluss-Stauffer A.G. of Oftringen, Switzerland.

The mixtures were allowed to cure for 14 days at room temperature, and then immersed in hydrochloric acid (12% w./v. HCl) for 7 days at room temperature. The sample prepared from mixture A was almost completely degraded, whereas that prepared from mixture B was virtually unaffected.

"Thiokol LP 32" is a long-chain polysulfide having an average molecular weight of 4,000. "Varon A" is a china clay hydrophobic material with a loose bulk density of 6.36 kg. per litre and with a typical analysis of the major ingredients of 46.5% of silicon dioxide and 37.7% of aluminum oxide.

What is claimed is:

1. A curable composition of matter which comprises (a) a polymeric adduct, containing on average more than two mercaptan groups per molecule, of (1) an alkylene monoepisulphide with (2) a compound containing more than two active hydrogen atoms selected from the group consisting of primary amines and polythiols, said adduct containing a repeating unit (alkylene —S—), directly attached through a carbon atom thereof to an atom selected from the group comprising a nitrogen atom in the said primary amine and a sulphur atom in the said polythiol, and (b) an oxidative curing agent for the said adduct.

2. A composition according to claim 1, wherein the monoepisulphide (1) is an alkylene episulphide containing from 2 to 5 carbon atoms.

3. A composition according to claim 2, wherein the monoepisulphide (1) is propylene sulphide.

4. A composition according to claim 1, wherein the compound (2) containing at least two active hydrogen atoms is a polythiol with at least three mercaptan groups per molecule.

5. A composition according to claim 1, wherein the compound (2) containing at least two active hydrogen atoms is a polyamine with at least two primary amino groups.

6. A composition according to claim 1, wherein the compound (2) containing at least two active hydrogen atoms is a polyamine with at least one primary amino group and at least one secondary amino group.

7. A composition according to claim 5, wherein the compound (2) is a non-aromatic polyamine having not more than 20 carbon atoms and containing at least two primary amino groups.

8. A composition according to claim 1, wherein the oxidative curing agent (b) is a member selected from the group consisting of lead dioxide and tellurium dioxide.

9. A composition according to claim 1 which further contains a basic accelerator for the oxidative curing reaction.

10. A composition according to claim 9, wherein the accelerator is a member selected from the group consisting of tertiary amines and alkali-modified clays.

11. A composition according to claim 1 which further contains a tackifier.

References Cited

UNITED STATES PATENTS

| | | | |
|---|---|---|---|
| 3,301,796 | 1/1967 | Herold | 260—79 |
| 3,322,851 | 5/1967 | Berenbaum | 260—79 |
| 3,234,188 | 2/1966 | Warner | 260—79 |
| 3,413,261 | 11/1968 | Schalin | 260—79 |

FOREIGN PATENTS 631,016  6/1936  Germany.

OTHER REFERENCES

Gaylord: Polyethers, Part III, Interscience Publishers, New York, 1962, pp. 165–166.

Snyder et al.: J.A.C.S. 69, 2672 (1947).

Journal of Organic Chemistry, Tank et al.: 29 (4) 974–5 (1964).

MURRAY TILLMAN, Primary Examiner

P. LIEBERMAN, Assistant Examiner

U.S. Cl. X.R.

260—830, 838, 37, 609, 327